(12) United States Patent
Bartel et al.

(10) Patent No.: US 11,420,445 B2
(45) Date of Patent: Aug. 23, 2022

(54) QUICK CONNECT ASSEMBLY FOR FLUID AND ELECTRICAL CONNECTIONS

(71) Applicant: Illinois Tool Works Inc., Glenview, IL (US)

(72) Inventors: Keith Allen Bartel, O Fallon, MO (US); Robert E. Gehrin, Dardenne Prairie, MO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/984,476

(22) Filed: Aug. 4, 2020

(65) Prior Publication Data

US 2020/0361213 A1 Nov. 19, 2020

Related U.S. Application Data

(62) Division of application No. 15/897,395, filed on Feb. 15, 2018.

(Continued)

(51) Int. Cl.
*B41J 2/175* (2006.01)
*H01R 13/625* (2006.01)
(Continued)

(52) U.S. Cl.
CPC ........... *B41J 2/17523* (2013.01); *B41J 2/175* (2013.01); *B41J 2/1753* (2013.01);
(Continued)

(58) Field of Classification Search
CPC .... B41J 2/175; B41J 2/17509; B41J 2/17523; B41J 2/1753; B41J 2/17553; B41J 2/17596; F16L 37/08; H01R 13/005; H01R 13/625
See application file for complete search history.

(56) References Cited

U.S. PATENT DOCUMENTS 4,551,734 A * 11/1985 Causley ............... B41J 2/17513
101/364
5,970,273 A * 10/1999 Zenk .................... G03G 15/104
399/12
(Continued)

FOREIGN PATENT DOCUMENTS

CN 1259091 A 7/2000
CN 1558831 A 12/2004
(Continued)

OTHER PUBLICATIONS

First Office Action dated Aug. 4, 2020 for corresponding Chinese Patent Application No. 201880026830.8.
(Continued)

*Primary Examiner* — Carl J Arbes
(74) *Attorney, Agent, or Firm* — Christopher R. Carroll; The Small Patent Law Group LLC (57) ABSTRACT

A quick connect assembly includes a connector housing and fluid connectors that fluidly couple an ink assembly and a print assembly. The quick connect assembly also includes conductive connectors that conductively couple hardware circuitry in the ink assembly with hardware circuitry in the print assembly. First and second portions of the connector housing mate with each other to couple the fluid connectors and to couple the conductive connectors. The first and second housing portions mate with each other by rotating the first housing portion and/or the second housing portion relative to the other of the first housing portion and/or the second housing portion.

14 Claims, 7 Drawing Sheets

Related U.S. Application Data (60) Provisional application No. 62/471,135, filed on Mar. 14, 2017.

(51) Int. Cl.
*H01R 13/00* (2006.01)
*F16L 37/08* (2006.01)

(52) U.S. Cl.
CPC ....... *B41J 2/17509* (2013.01); *B41J 2/17553* (2013.01); *H01R 13/005* (2013.01); *H01R 13/625* (2013.01); *B41J 2/17596* (2013.01); *F16L 37/08* (2013.01)

(56) References Cited

U.S. PATENT DOCUMENTS

| | | | | |
|---|---|---|---|---|
| 5,992,975 | A * | 11/1999 | Gasvoda | B41J 2/175 347/50 |
| 6,386,675 | B2 * | 5/2002 | Wilson | B41J 2/17556 347/19 |
| 9,987,851 | B2 * | 6/2018 | Kanbara | B41J 2/175 |
| 2009/0096836 | A1 * | 4/2009 | Haines | B65D 77/067 347/49 |
| 2011/0254905 | A1 * | 10/2011 | Hayashi | B41J 2/17513 347/86 |
| 2015/0273501 | A1 * | 10/2015 | Naito | B41J 2/17523 239/373 |
| 2015/0273842 | A1 * | 10/2015 | Aoki | B41J 2/17553 347/86 |

FOREIGN PATENT DOCUMENTS

| | | |
|---|---|---|
| CN | 102218904 A | 10/2011 |
| CN | 104797427 A | 7/2015 |
| CN | 104943388 A | 9/2015 |
| EP | 2607081 A1 | 6/2013 |
| EP | 3081383 A1 | 10/2016 |
| JP | 2006306041 A | 11/2006 |
| JP | 2015112842 A | 6/2015 |

OTHER PUBLICATIONS

English translation of the First Office Action dated Aug. 4, 2020 for corresponding Chinese Patent Application No. 201880026830.8.
Search report attached to the First Office Action dated Aug. 4, 2020 for corresponding Chinese Patent Application No. 201880026830.8.
Examination Report dated Dec. 17, 2020 for corresponding European Application No. 18708281.3 (5 pages).
Office Action dated Oct. 9, 2020 for corresponding Chilean Patent Application 2630-2019.
English translation of the Office Action dated Oct. 9, 2020 for corresponding Chilean Patent Application 2630-2019.
Office Actioin dated Nov. 2, 2021 for corresponding Japanese Appliction No. 2019-550663. (3 pages).

* cited by examiner

QUICK CONNECT ASSEMBLY FOR FLUID AND ELECTRICAL CONNECTIONS

CROSS-REFERENCE TO RELATED APPLICATIONS

This application is a divisional of U.S. patent application Ser. No. 15/897,395, filed 15 Feb. 2018 (now U.S. Pat. No. 10,894,419), which claims priority to U.S. Provisional Application No. 62/471,135, filed 14 Mar. 2017. The entire disclosures of these applications are incorporated herein by reference.

FIELD

Embodiments of the inventive subject matter described herein relate to assemblies that fluidly and conductively couple two or more assemblies, such as printing and ink assemblies.

BACKGROUND

Printing systems, such as ink jet printers, may include an ink assembly that stores ink for printing and a print assembly that receives the ink from the ink assembly. The print assembly ejects the ink onto one or more target substrates to form an image, indicium, or the like, on the target substrates using the ink.

In some printing systems, the ink and print assemblies are formed in or located within the same housing. Operations such as replenishing ink, repairing the ink and/or print assemblies, or other operations may require opening this housing to obtain access to the necessary parts for the operation. The fluid and electrical connections between the assemblies are disposed in this housing. The single housing for both assemblies can result in significant down time and increased risk of damage to parts of the assembly not being worked on at that time. For example, having to open the housing to replenish ink in the ink assembly can risk damage or unintentional changes to the print assembly.

BRIEF DESCRIPTION

In one embodiment, a quick connect assembly includes a connector housing formed from at least separate first and second housing portions, and one or more fluid connectors disposed in each of the first housing portion and the second housing portion of the connector housing and configured to fluidly couple an ink assembly and a print assembly. The ink assembly stores ink for the print assembly and the print assembly receives the ink via the one or more fluid connectors for printing onto one or more target substrates. The assembly also includes one or more conductive connectors disposed in each of the first housing portion and the second housing portion of the connector housing and configured to conductively couple hardware circuitry in the ink assembly with hardware circuitry in the print assembly. The hardware circuitry in the ink assembly controls supply of the ink to the print assembly, and the hardware circuitry in the print assembly controls printing of the ink onto the one or more target substrates. The first and second housing portions of the connector housing are configured to mate with each other to couple the one or more fluid connectors disposed in each of the first and second housing portions and to couple the one or more conductive connectors disposed in each of the first and second housing portions. The first and second housing portions configured to mate with each other by rotating at least one of the first housing portion or the second housing portion relative to another of the first housing portion or the second housing portion.

In one embodiment, a method (e.g., for providing a quick connect assembly) includes obtaining a connector housing, and placing one or more fluid connectors in the connector housing, the one or more fluid connectors configured to fluidly couple an ink assembly and a print assembly. The ink assembly stores ink for the print assembly and the print assembly receives the ink via the one or more fluid connectors for printing onto one or more target substrates. The method also includes placing one or more conductive connectors in the connector housing. The one or more conductive connectors are configured to conductively couple hardware circuitry in the ink assembly with hardware circuitry in the print assembly. The hardware circuitry in the ink assembly controls supply of the ink to the print assembly, and the hardware circuitry in the print assembly controls printing of the ink onto the one or more target substrates.

In one embodiment, a method (e.g., for operating a quick disconnect assembly) includes coupling a first end of a connector housing with an ink assembly. The connector housing includes one or more fluid connectors that fluidly couple with the ink assembly that stores ink for a print assembly. The connector housing also includes one or more conductive connectors that conductively couple with hardware circuitry in the ink assembly that controls supply of the ink from the ink assembly. The method also includes coupling a different, second end of the connector housing with the print assembly. The connector housing is coupled with the print assembly so that the one or more fluid connectors also fluidly couple with the print assembly to supply the ink from the ink assembly to the print assembly. The connector housing is coupled with the print assembly so that the one or more conductive connectors also conductively couple with hardware circuitry in the print assembly that controls printing of the ink onto one or more target substrates.

BRIEF DESCRIPTION OF THE DRAWINGS

Reference is now made briefly to the accompanying drawings, in which.

DETAILED DESCRIPTION

One or more embodiments of the inventive subject matter described herein provide for a quick connect assembly for connecting an ink assembly with a print assembly. The connect assembly includes one or more fluid connectors in a connector housing. The fluid connectors fluidly couple the ink assembly with the print assembly. The ink assembly stores ink for the print assembly and the print assembly receives the ink via the fluid connectors for printing the ink onto one or more target substrates. The connect assembly also includes one or more conductive connectors in the same connector housing. The conductive connectors conductively couple hardware circuitry in the ink assembly with hardware circuitry in the print assembly. The hardware circuitry in the ink assembly controls the supply of the ink to the print assembly, and the hardware circuitry in the print assembly controls printing of the ink onto the target substrates.

The connector housing can be shaped to be secured to the ink assembly and/or the print assembly by rotating the connector housing relative to an ink housing of the ink assembly and/or a printer housing of the print assembly. The connector housing optionally includes securing pins that are received into one or more corresponding slots in a housing of the ink assembly and/or the print assembly. Optionally, the connector housing is secured to the print assembly and/or ink assembly using another device or component.

The connector housing can secure the print assembly to the ink assembly at a variety of different angles. This can allow for a user to selectively choose the angle at which the print assembly ejects ink toward the target substrates without having to move the ink assembly. Because the ink assembly holds fluid ink, operation of the ink assembly may require that the ink assembly remain stationary or substantially flat (e.g., level relative to ground) to ensure that the ink is able to be pumped into the print assembly and/or drawn out of the ink assembly.

The connector housing is a rigid body in one embodiment. The rigid housing can secure the ink and print assemblies to each other without permitting significant movement of one assembly relative to the other (e.g., movement outside of manufacturing tolerances within the connections or engagements between the assemblies). Optionally, the connector housing is a flexible body that allows the ink and/or print assemblies to move relative to each other while the connector housing maintains the fluid and conductive connections between the assemblies.

Figures 1, 2:
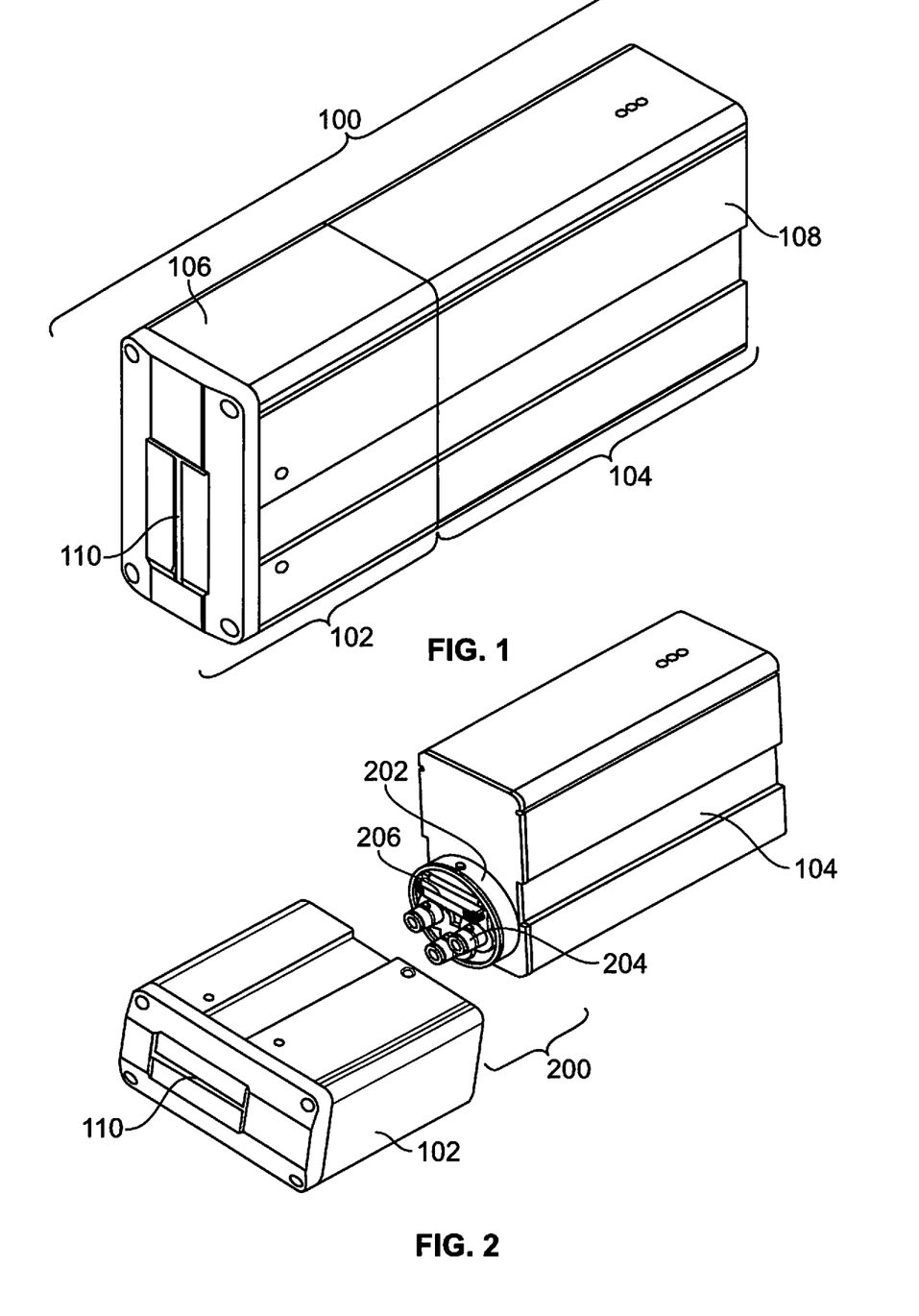
FIG. 1 illustrates a perspective view of one embodiment of a printing system.
FIG. 2 illustrates an exploded view of the printing system shown in FIG. 1 with a quick connect assembly according to one embodiment.

FIG. 1 illustrates a perspective view of one embodiment of a printing system 100. The printing system 100 includes a print assembly 102 that is fluidly and conductively coupled with an ink assembly 104 by a quick connect assembly 200 (shown in FIG. 2, but not visible in FIG. 1). The ink assembly 104 includes a housing 108 with one or more internal reservoirs (not visible in FIG. 1) that hold ink for use by the print assembly 102. These reservoirs are fluidly coupled with the quick connect assembly by one or more conduits, such as one or more hoses, pipes, or the like. The print assembly 102 includes a housing 106 having one or more conduits that receive the ink from the ink assembly 104 and direct the ink out of the printing system 100 via one or more orifices 110 for printing onto target surfaces or substrates. The ink assembly 104 and print assembly 102 also include hardware circuitry that conduct electric signals for controlling the flow of ink from the ink assembly 104 to the print assembly 102, and that control printing of the ink from the print assembly 102 onto the target substrates. Although not visible, this circuitry can include buses, wires, processors (e.g., one or more microprocessors, field programmable gate arrays, integrated circuits, and/or processors).

The conduits in the print and ink assemblies 102, 104 that carry the ink through the printing system 100 are fluidly coupled with each other by one or more fluid connectors (not visible in FIG. 1) in the quick connect assembly 200. The hardware circuitry in the print and ink assemblies 102, 104 that control the printing of the ink are conductively coupled with each other by one or more electrical connectors (not visible in FIG. 1) in the quick connect assembly. The quick connect assembly 200 is shaped to allow for the print and ink assemblies 102, 104 to be rapidly disconnected from each other, including by disconnecting the ink conduits in the print and ink assemblies 102, 104 from each other and by disconnecting the hardware circuitry in the print and ink assemblies 102, 104 from each other at the same time.

Figure 3:
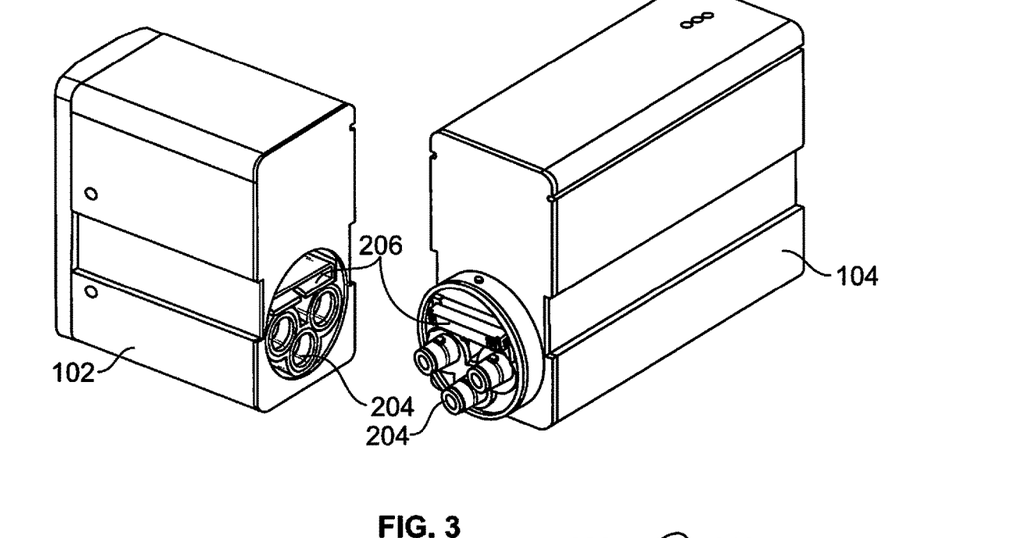
FIG. 3 illustrates another exploded view of the printing system shown in FIG. 1 with the quick connect assembly shown in FIG. 2 according to one embodiment.

FIGS. 2 and 3 illustrate exploded views of the printing system 100 with the quick connect assembly 200 according to one embodiment of the inventive subject matter described herein. The quick connect assembly 200 includes a connector housing 202 that forms the outer boundary or surfaces of the quick connect assembly 200. The housing 202 extends from a first end 316 that couples with the print assembly 102 and an opposite second end 318 that couples with the ink assembly 104. In the illustrated embodiment, the connector housing 202 is divided into several portions, with one portion coupled with the ink assembly 104 and another other portion or half coupled with the print assembly 102.

One or more fluid connectors 204 are disposed in the connector housing 202. Three pairs of mating fluid connectors 204 are included in the connector housing 202 in the illustrated embodiment, but as few as a single pair of mating fluid connectors 204, two pairs of fluid connectors 204, or more than three pairs of fluid connectors 204 can be included in the quick connect assembly 200. The connector housing 202 can include one or more fluid connectors 204 in different portions of the connector housing 202, with the fluid connector or connectors 204 in the different portions of the connector housing 202 positioned to engage, mate, or otherwise connect with the fluid connector or connectors 204 in another portion of the connector housing 202. The fluid connector or connectors 204 in the portion of the connector housing 202 that is coupled with the ink assembly 104 are fluidly coupled with one or more reservoirs or other storage chambers for ink inside the ink assembly 104, such as by one or more conduits, pipes, tubes, etc. The fluid connector or connectors 204 in the portion of the connector housing 202 that is coupled with the print assembly 102 are fluidly coupled with the printing hardware in the print assembly 102 that ejects the ink out of the orifices 110 in the print assembly 102 for printing onto one or more surfaces of a target object.

The fluid connectors 204 in the portions of the connector housing 202 fluidly couple with each other when the portions of the connector housing 202 mate with each other to allow for ink to be transferred from the ink assembly 104 to the print assembly 102 for printing, but can decouple from each other while preventing the ink from exiting from either assembly 102, 104 through the fluid connectors 204 when the fluid connectors 204 are detached or otherwise disconnected from each other. For example, the fluid connectors 204 can include valves (e.g., check valves) that close to prevent fluid from passing through the connectors 204 when the connectors 204 are disconnected from each other.

One or more pairs of conductive connectors 206 are disposed in the connector housing 202. For example, one portion of the connector housing 202 can include a conductive connector 206 that mates with a corresponding or complementary conductive connector 206 in another portion of the connector housing 202. The conductive connectors 206 conductively couple hardware circuitry in each of the ink and print assemblies 104, 102 with each other. The circuitry in the ink assembly 104 can monitor and/or control the flow of ink through the ink assembly 104 to the print assembly 102 (e.g., via the fluid connectors 204), such as by controlling operation of one or more pumps. The circuitry in the print assembly 102 can control the flow of ink out of the orifices 110 to print indicium on one or more surfaces of target objects.

Figure 4:
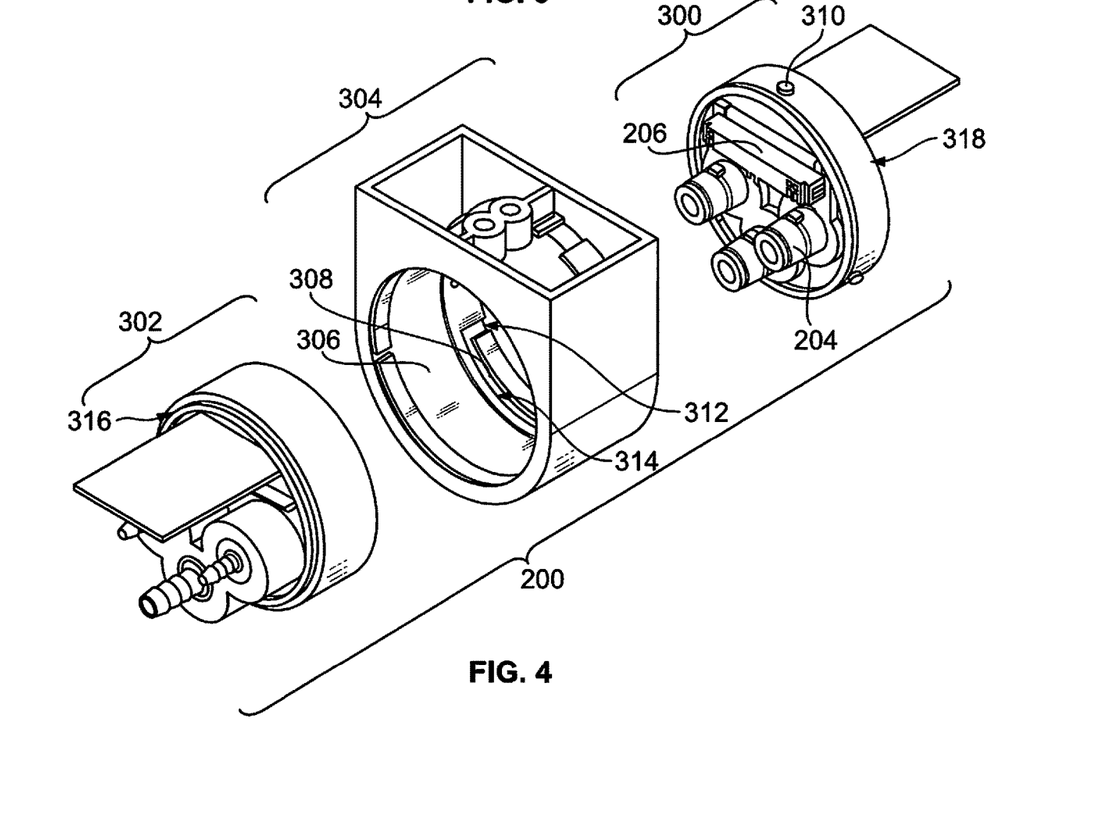
FIG. 4 illustrates an exploded view of the quick connect assembly shown in FIGS. 2 and 3.

FIG. 4 illustrates an exploded view of the quick connect assembly 200. The connector housing 202 includes three portions 300, 302, 304 in the illustrated embodiment, but optionally can include two portions or more than three portions. A first end portion 300 of the connector housing 202 is coupled with the ink assembly 104, an opposite, second end portion 302 of the connector housing 202 is coupled with the print assembly 102, and a middle portion 304 of the connector housing 202 is coupled with the print assembly 102. Alternatively, the middle portion 304 of the connector housing 202 can be coupled with the ink assembly 104.

The end portion 300 of the connector housing 202 projects outward from the ink assembly 104. The end portion 300 projects from the end of the ink assembly 104 that faces or engages the print assembly 102 when the assemblies 102, 104 are coupled with each other. The end portion 300 can be referred to as a male portion of the connector housing 202.

The middle portion 304 of the connector housing 202 is received into a recess or a connector opening in the end of the print assembly 102 that faces or engages the ink assembly 104 when the assemblies 102, 104 are coupled with each other. The middle portion 304 can be referred to as a female portion of the connector housing 202. The other end portion 302 of the connector housing 202 is located inside the middle portion 304. In one embodiment, the end portion 302 can be disposed in the middle portion 304 without any fasteners, adhesives, screws, or the like. The end portion 302 can be allowed to rotate within the middle portion 304 to allow coupling and decoupling between the assemblies 102, 104 to occur through rotation.

For example, the middle portion 304 includes an inner surface 306 having a cylindrical shape in the illustrated embodiment. The inner surface 306 can include one or more recess tracks or slots 308 that extend along the inner surface 306 in a semi-circular path, helical path, or other path. The end portion 300 includes one or more securing pins 310 that project from an outer or exterior surface of the end portion 300. The securing pin or pins 310 can radially extend away from the outer or exterior surface of the end portion 300. The securing pin or pins 310 are received into corresponding slots 308 in the inner surface 306 of the middle portion. Alternatively, the middle portion 304 can include the pins 310 and the end portion 300 can include the slots 308. In another embodiment, components other than pins 310 and slots 308 are used to couple the end portion 300 and the middle portion 304. For example, machined lugs and slots, a threaded mating connection, or the like, can be used.

The end portion 300 and/or middle portion 304 can be rotated relative to each other (such as by rotating only the print assembly 102, only rotating the ink assembly 104, or rotating both the print and ink assemblies 102, 104 in opposite directions). Receipt of the securing pins 310 into the slots 308 prevents the end portion 300 from being separated from the middle portion 304, which prevents separation of the print and ink assemblies 102, 104 from each other. To separate the print and ink assemblies 102, 104, the end portion 300 and/or middle portion 304 are rotated relative to each other (as are the print and ink assemblies 102, 104) until the securing pins 310 are at or near ends of the slots 308 such that the end portion 300 can be pulled away from the middle portion 304 along a linear direction. This allows for quick and easy connection and disconnection of the end and middle portions 300, 304, which also allows for quick and easy connection and disconnection of the print and ink assemblies 102, 104.

The slots 308 and securing pins 310 are positioned on the middle and end portions 304, 300 of the connector housing 202 such that, when the securing pins 310 are initially received into the slots 308, the fluid connectors 204 in the end portions 300, 302 of the housing 202 directly oppose each other and the conductive connectors 206 in the end portions 300, 302 of the housing 202 directly oppose each other. The slots 308 are shaped to include a linear path 312 that directs the securing pins 310 along directions that are parallel to a center axis of the inner surface 306 for a sufficiently far distance that causes the fluid connectors 204 to couple with each other and that causes the conductive connectors 206 to couple with each other. The slots 308 are shaped to include semi-circular or helical paths 314 that direct the securing pins 310 along directions that helically wrap around, encircle, or otherwise extend around the center axis of the inner surface 306. This allows for rotation of the assemblies 102, 104 to secure the assemblies 102, 104 to each other.

Figure 5:
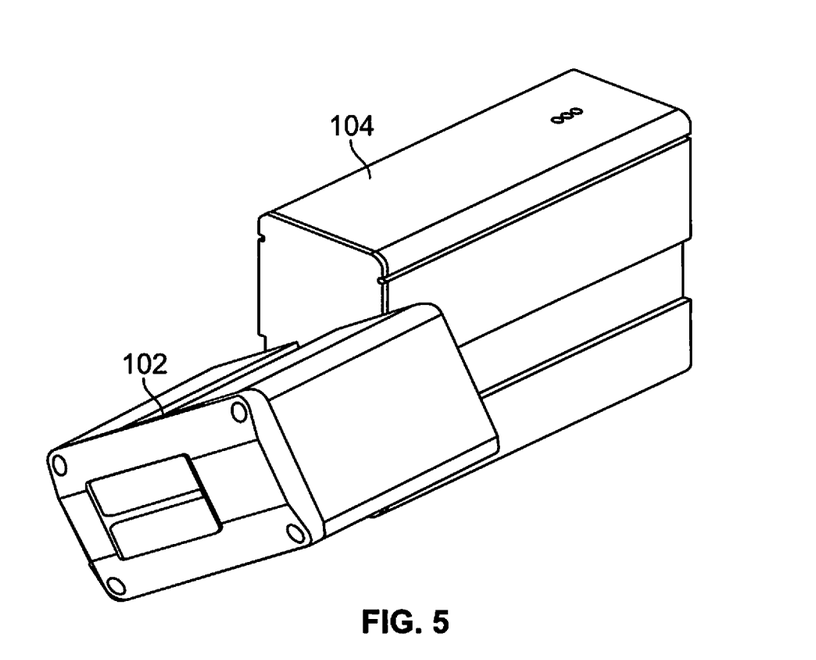
FIG. 5 illustrates a perspective view of print and ink assemblies shown in FIG. 1 coupled at different angles during printing.
Figure 6:
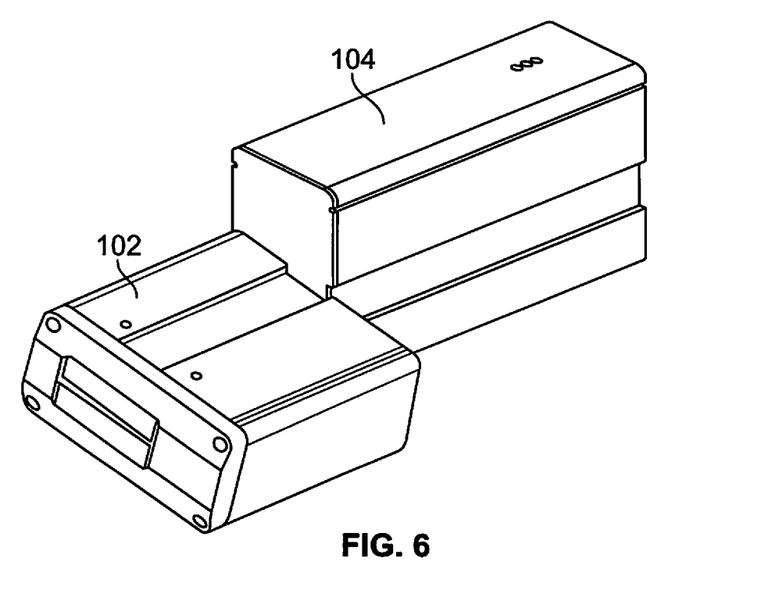
FIG. 6 illustrates another perspective view of print and ink assemblies shown in FIG. 1 coupled at different angles during printing.

In one embodiment, the connector assembly 200 can allow for the print and ink assemblies 102, 104 to remain coupled with each other (e.g., both fluidly via the fluid connectors 204 and conductively via the conductive connectors 206) at a variety of different angles. In FIG. 1, the print and ink assemblies 102, 104 are coupled at one angle. FIGS. 5 and 6 illustrate perspective views of the print and ink assemblies 102, 104 coupled at different angles during printing. The print assembly 102 and/or ink assembly 104 can be rotated relative to the other assembly 104 or 102 by rotating the end portion 300 inside the middle portion 304. This can allow for the print assembly 102 to be positioned in a wide variety of angles relative to the ink assembly 104, while allowing the ink assembly 104 to remain stationary for storage of the fluid ink. So long as the securing pins 310 of the end portion 300 of the connect assembly 200 remain inside or otherwise coupled to the slots 308 of the middle portion 304 of the connect assembly 200, the fluid connectors 204 can remain coupled and the conductive connectors 206 can remain coupled, thereby allowing the print and ink assemblies 102, 104 to continue operating at a variety of angles.

This can allow for the ink assembly 104 to remain stationary or substantially stationary to avoid preventing ink to flow through the assemblies 102, 104. Orienting the ink assembly 104 at certain angles can result in the ink in reservoirs in the ink assembly 104 to not exit the reservoirs for supply to the print assembly 102. This can significantly restrict the orientations at which the print assembly 102 can be relative to the ink assembly 104. But, the connector assembly 200 allows for the print assembly 102 to be at different orientations (e.g., relative to the direction of gravity) while keeping the ink assembly 104 at the same orientation (e.g., relative to the direction of gravity) during printing.

Figure 7:
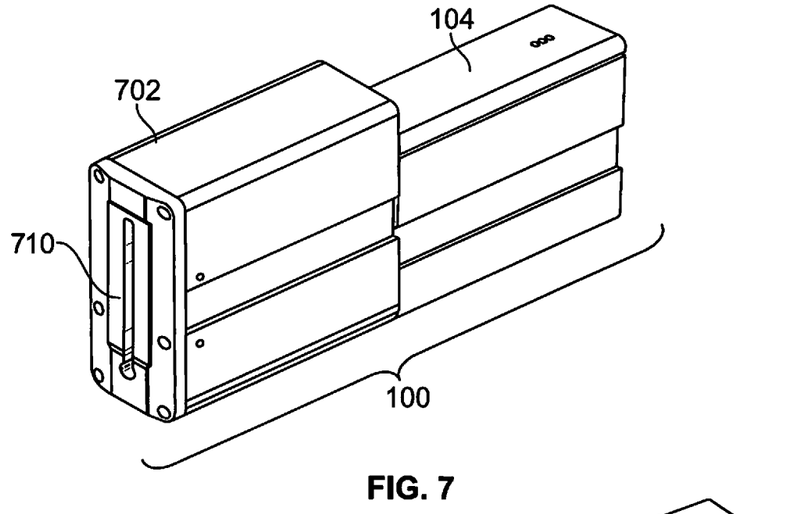
FIG. 7 illustrates one example of the printing system shown in FIG. 1 with a different print assembly attached to the ink assembly shown in FIG. 1.

The connector assembly 200 can allow for multiple, different print assemblies 102 to be coupled with the same ink assembly 104 at different times. For example, different print assemblies 102 having different orifices 110 and/or that print different images can be switched out while using the same end portion 300 of the connector assembly 200 and ink assembly 104. FIG. 7 illustrates one example of the printing system 100 shown in FIG. 1, but with a different print assembly 702 attached to the ink assembly 104. The print assembly 702 can be a different print assembly than the print assembly 102, but with the same or similar portions 302, 304 to allow the print assembly 702 to be fluidly and conductively coupled with the ink assembly 104. The print assembly 702 includes orifices 710 that differ from the orifices 110 shown in FIG. 1. This can result in the print assembly 702 printing larger indicium, different indicium, or the like, relative to the print assembly 102.

In one embodiment, the connector assembly 200 is a rigid body in the connector assemblies 200 shown in FIGS. 1 through 7. For example, the outer connector housing 202 can be formed from a rigid material that breaks if bent a single time too far in one or more directions (e.g., bent more than 30 degrees, bent more than 45 degrees, or bent more than 90 degrees). Examples of the materials from which the outer connector housing 202 can be formed include thermoset polymers, polyvinylchloride, polystyrene, or the like. Optionally, the connector assembly 200 can be at least include or be formed from a more flexible body, such as a body that can repeatedly bent in the one or more directions that the rigid body cannot to allow the print assembly 102 to be oriented in a variety of directions without breaking or fatiguing the flexible body.

Figure 8:
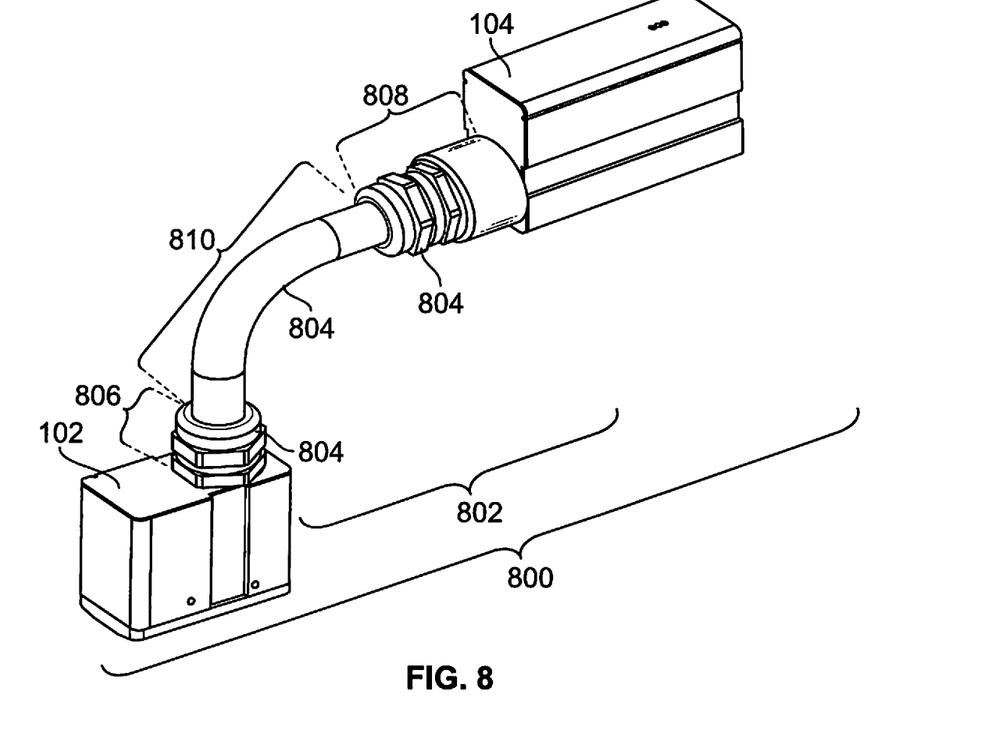
FIG. 8 illustrates a perspective view of one embodiment of a flexible printing system having a flexible quick connect assembly.
Figure 9:
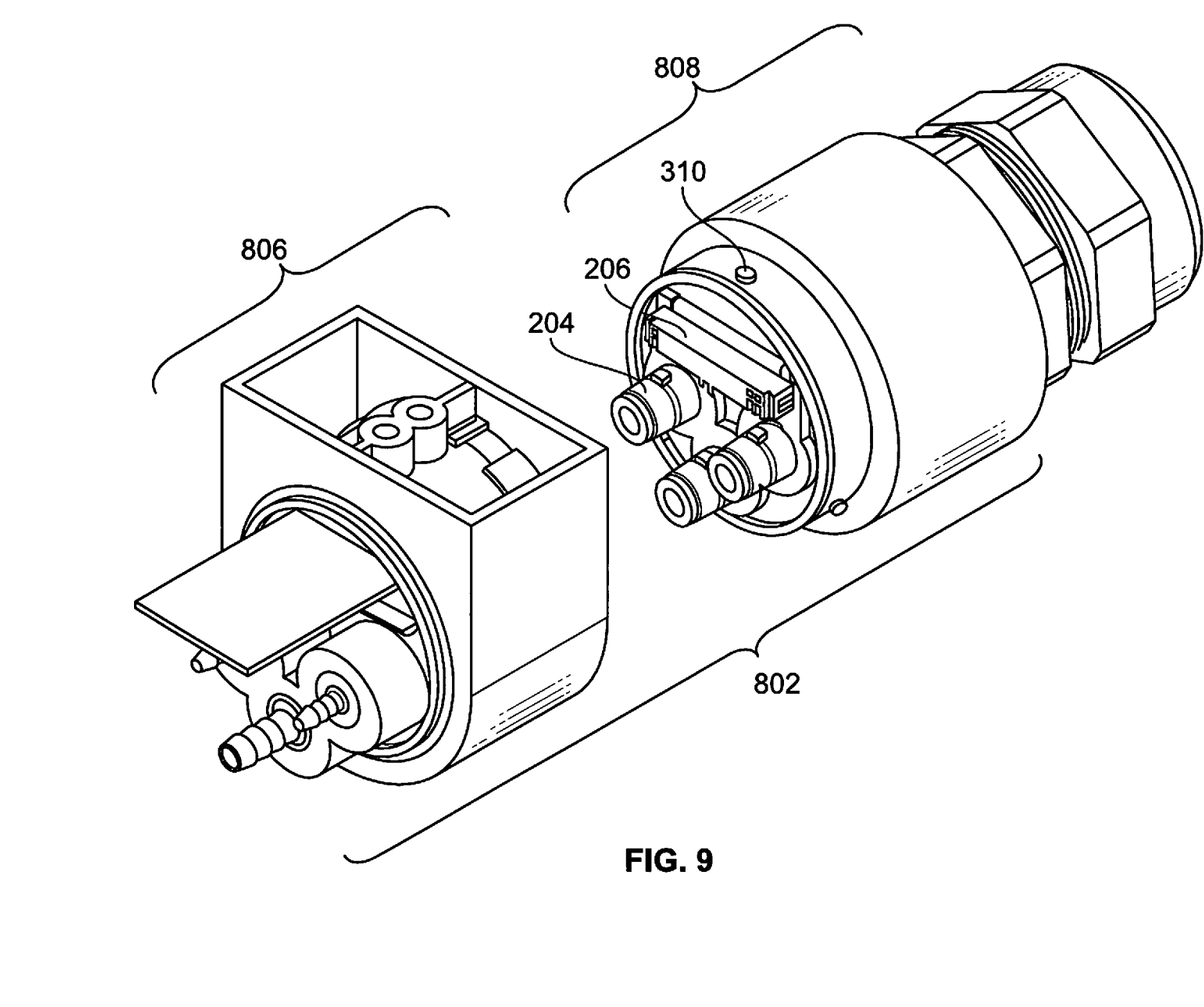
FIG. 9 illustrates an exploded view of the flexible quick connect assembly shown in FIG. 8.

FIG. 8 illustrates a perspective view of one embodiment of a flexible printing system 800 having a flexible quick connect assembly 802. FIG. 9 illustrates an exploded view of the flexible quick connect assembly 802 shown in FIG. 8. The printing system 800 includes the print assembly 102 that is fluidly and conductively coupled with the ink assembly 104 by the flexible quick connect assembly 802. The conduits in the print and ink assemblies 102, 104 that carry the ink through the printing system 800 are fluidly coupled with each other by one or more fluid connectors 204 in the flexible quick connect assembly 802. The hardware circuitry in the print and ink assemblies 102, 104 that control the printing of the ink are conductively coupled with each other by one or more electrical connectors 206 in the flexible quick connect assembly 802.

The flexible quick connect assembly 802 is shaped to allow for the print and ink assemblies 102, 104 to be rapidly disconnected from each other, including by disconnecting the ink conduits in the print and ink assemblies 102, 104 from each other and by disconnecting the hardware circuitry in the print and ink assemblies 102, 104 from each other at the same time. For example, the flexible quick connect assembly 802 can include the securing pins 310 and slots 308 (shown in FIG. 3) described above. The pins 310 and slots 308 to allow for the print assembly 102, ink assembly 104, and/or the flexible quick connect assembly 802 to be separated or connected with each other by relative rotation of the assemblies 102, 104, 802 being separated or disconnected, while avoiding spilling ink.

The flexible quick connect assembly 802 includes a connector housing 804 that is divided into several portions 806, 808, 810, with one end portion 806 coupled with the print assembly 102 and another end portion 808 coupled with the ink assembly 104. The end portions 806, 808 are coupled with each other by a flexible middle portion 810 of the flexible quick connect assembly 802. The end portions 806, 808 can be formed as rigid bodies (as described herein) while the middle portion 810 is formed as a flexible body, such as a hose.

The fluid connectors 204 in the end portions 806, 808 fluidly couple with conduits in the flexible portion 810 when the end portions 806, 808 are connected with the flexible portion 810. The fluid connectors 204 in the end portions 806, 808 are fluidly coupled with the print and ink assemblies 102, 104, as described above. The conductive connectors 206 in the end portions 806, 808 are conductively coupled with each other by one or more wires, busses, or the like, in the flexible portion 810. The conductive connectors 206 conductively couple hardware circuitry in each of the ink and print assemblies 104, 102 with each other. The circuitry in the ink assembly 104 can monitor and/or control the flow of ink through the ink assembly 104 to the print assembly 102 (e.g., via the fluid connectors 204), such as by controlling operation of one or more pumps. The circuitry in the print assembly 102 can control the flow of ink out of the print assembly 102 to print indicium on one or more surfaces of target objects.

The flexible quick connect assembly 802 is similar to the connect assembly 200 shown in FIGS. 1 through 6 except that end portions 806, 808 are connected with each other by the flexible portion 810. The flexible portion 810 allows for the print assembly 102 to be at a greater amount of different orientations relative to the ink assembly 104 (e.g., more orientations than the connector assembly 200) while avoiding having to change the orientation of the ink assembly 104 relative to the direction of gravity. For example, the print assembly 102 can be oriented such that the orifices 110 face downward in the direction of gravity to print on objects below the printing system 100 while the ink assembly 104 remains in the same orientation as shown in FIGS. 1 through 6.

Figure 10:
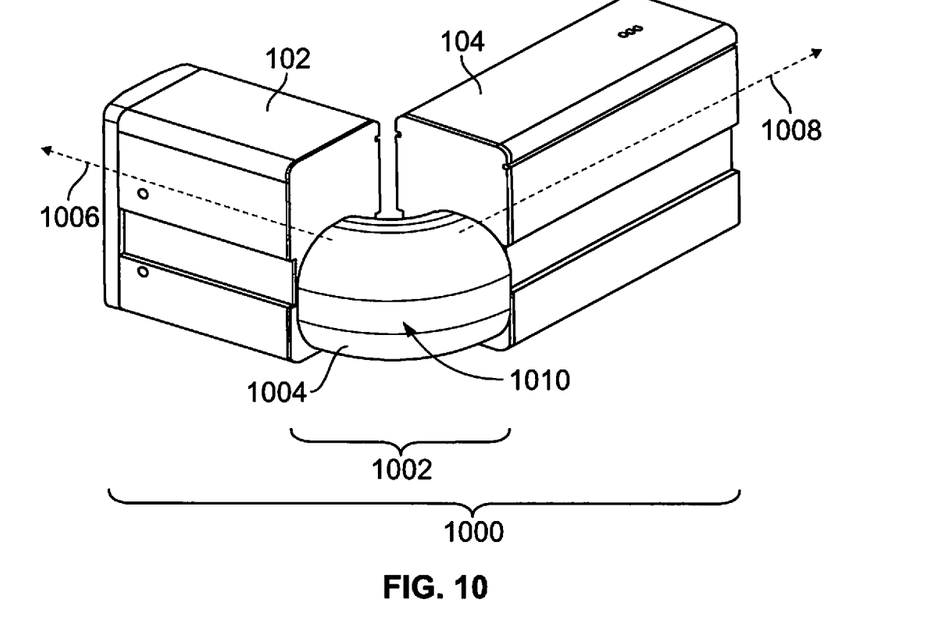
FIG. 10 illustrates a perspective view of one embodiment of a fixed orientation printing system having a fixed orientation quick connect assembly.
Figure 11:
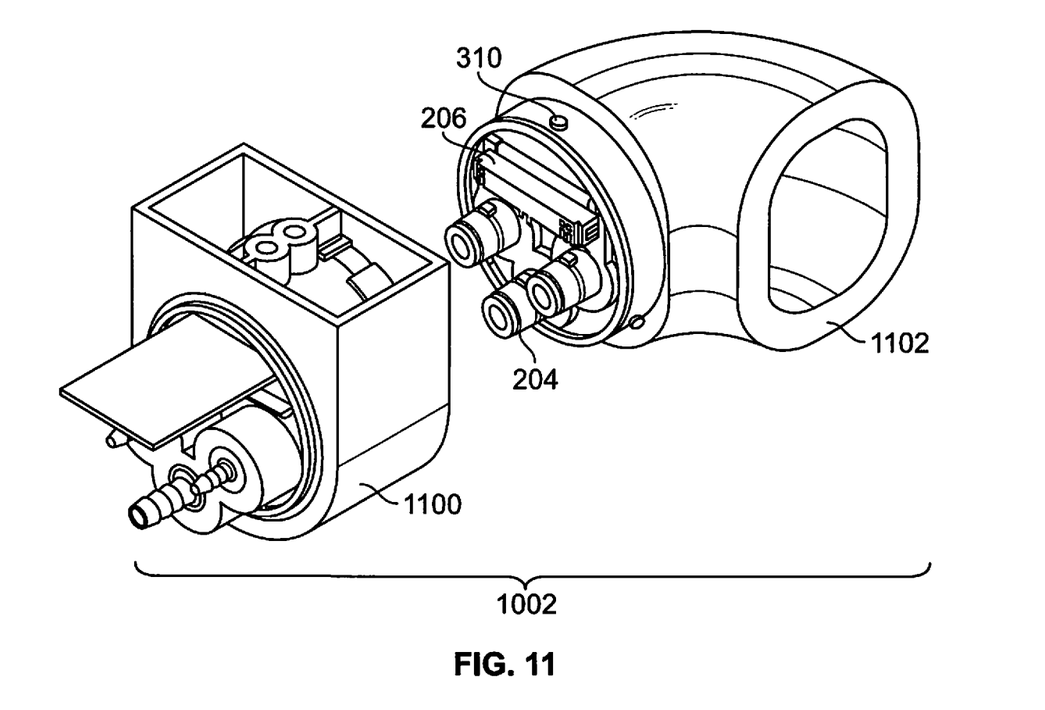
FIG. 11 illustrates an exploded view of the fixed orientation quick connect assembly shown in FIG. 10.

FIG. 10 illustrates a perspective view of one embodiment of a fixed orientation printing system 1000 having a fixed orientation quick connect assembly 1002. FIG. 11 illustrates an exploded view of the fixed orientation quick connect assembly 1002 shown in FIG. 10. The printing system 1000 includes the print assembly 102 that is fluidly and conductively coupled with the ink assembly 104 by the fixed orientation quick connect assembly 1002. The conduits in the print and ink assemblies 102, 104 that carry the ink through the printing system 1000 are fluidly coupled with each other by one or more fluid connectors 204 in the fixed orientation quick connect assembly 1002. The hardware circuitry in the print and ink assemblies 102, 104 that control the printing of the ink are conductively coupled with each other by one or more electrical connectors 206 in the fixed orientation quick connect assembly 1002.

The fixed orientation quick connect assembly 1002 is shaped to allow for the print and ink assemblies 102, 104 to be rapidly disconnected from each other, including by disconnecting the ink conduits in the print and ink assemblies 102, 104 from each other and by disconnecting the hardware circuitry in the print and ink assemblies 102, 104 from each other at the same time. For example, the assembly 1002 can include the securing pins 310 and slots 308 (shown in FIG. 3) described above to allow for the print assembly 102, ink assembly 104, and/or the connect assembly 1002 to be separated or connected with each other by relative rotation of the assemblies being separated or disconnected, while avoiding spilling ink. As shown in FIGS. 10 and 11, one or more of the assemblies 102, 104 can be rotated relative to each other and optionally relative to the connect assembly 1002 to allow the print assembly 102 to be positioned at a variety of different angles relative to the ink assembly 104.

The fixed orientation quick connect assembly 1002 includes a connector housing 1004 that is divided into several end portions 1100, 1102 (shown in FIG. 11), with one end portion 1102 coupled with the ink assembly 104 and another end portion 1100 coupled with the print assembly 102. Only the end portion 1102 is visible in FIG. 10 in the illustrated embodiment. The end portions 1100, 1102 are directly coupled with each other in the illustrated embodiment. For example, there is no interconnecting middle portion of the housing 1004 that couples the end portions 1100, 1102 with each other in the embodiment shown in FIGS. 10 and 11. Instead, the end portions 1100, 1102 directly connect with each other using the securing pins 310 and slots 308 (shown in FIG. 3) described above. Optionally, the housing 1004 may include a middle portion that interconnects with the end portions 1100, 1102 as described above in connection with the other connect assemblies.

In contrast to the flexible connect assembly 802 shown in FIGS. 8 and 9, the housing 1004 of the fixed orientation connect assembly 1002 does not include a flexible middle portion 810 (shown in FIGS. 8 and 9). The housing 1004 of the fixed orientation connect assembly 802 is a rigid body (as described above) that holds the print and ink assemblies 102, 104 in a fixed orientation relative to each other. For example, an orientation or angle between linear directions or axes 1006, 1008 (shown in FIG. 10) in which each of the print and ink assemblies 102, 104 are elongated, respectively, does not change when the print and ink assemblies 102, 104 are connected with the fixed orientation connect assembly 802 in the illustrated embodiment. While one or more of the print or ink assembly 102, 104 can rotate around or about the respective direction or axis 1006, 1008, the directions or axes 1006, 1008 of elongation of the print and ink assemblies 102, 104 remain in the same orientation relative to each other.

In contrast to the quick connect assembly 200 shown in FIGS. 2 through 4, the housing 1004 of the fixed orientation connect assembly 1002 includes a bend 1010. The bend 1010 is a ninety-degree bend in the illustrated embodiment. For example, the directions or axes 1006, 1008 in which the print and ink assemblies 102, 104 are elongated are oriented at a ninety-degree angle to each other. Alternatively, the bend 1010 can be another angle, such as one hundred thirty-five degrees, forty-five degrees, thirty degrees, fifteen degrees, five degrees, or the like. Different fixed orientation connect assemblies 1002 having different angles in the bend 1010 can be interchanged with the same print and ink assemblies 102, 104 to allow for a variety of printing orientations and directions in the printing system.

Figure 12:
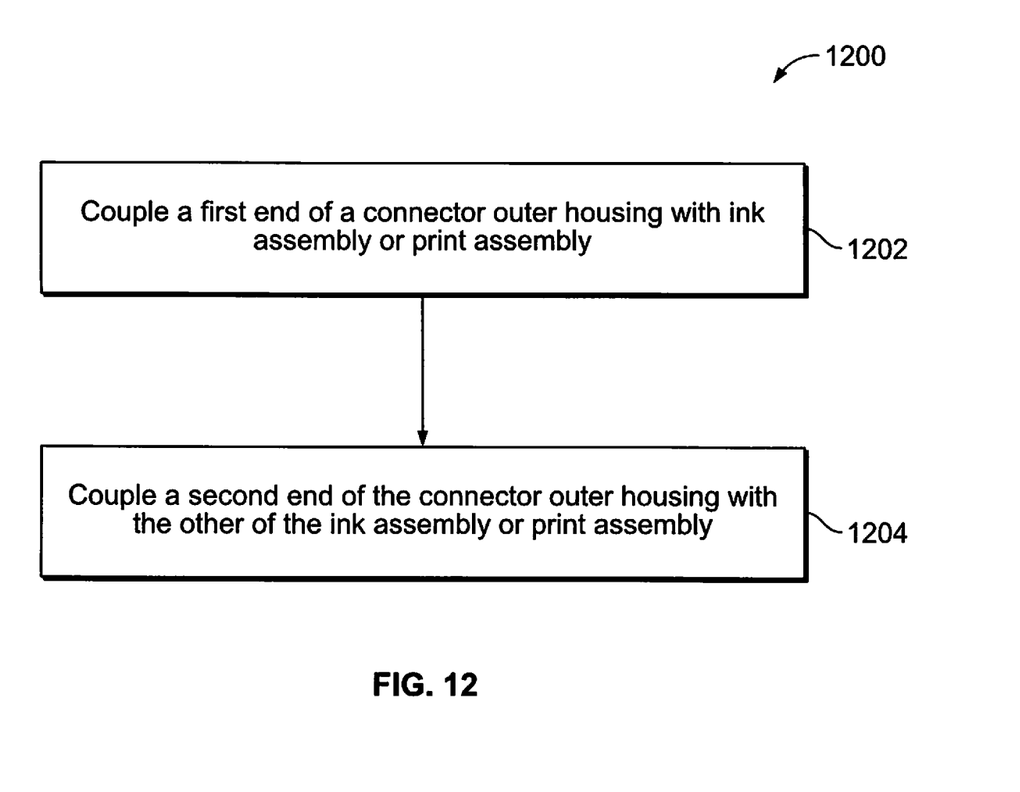
FIG. 12 illustrates a flowchart of a method for providing a quick connect assembly for a printing system.

FIG. 12 illustrates a flowchart of a method 1200 for providing a quick connect assembly for a printing system. The method 1200 can be used to provide one or more of the printing systems described herein. At 1202, a first end of a connector housing is coupled with an ink assembly or a print assembly. In one embodiment, the coupling occurs by inserting radially protruding pins in the housing into corresponding slots in the ink or print assembly and rotating the housing relative to the ink or print assembly.

At 1204, a different, second end of the connector housing is coupled with the other of the ink or print assemblies. In one embodiment, the coupling occurs by inserting radially protruding pins in the housing into corresponding slots in the ink or print assembly and rotating the housing relative to the ink or print assembly. The connector housing is coupled with the print and ink assemblies so that one or more fluid connectors in the housing also fluidly couple with the ink and print assemblies to supply the ink from the ink assembly to the print assembly. The connector housing is coupled with the print assembly and the ink assembly so that one or more conductive connectors in the housing conductively couple with hardware circuitry in the print and ink assemblies that control printing of the ink onto one or more target substrates.

The method 1200 optionally can include coupling end portions of the connector housing with a flexible middle portion. For example, before, during, or after coupling the end portions with the print and ink assemblies, a flexible hose can be coupled with the end portions to provide a flexible interconnection between the end portions. The method 1200 optionally can include switching out the connector housing that connects the ink and print assemblies with another, different connector housing, such as a connector housing with a different bend angle, a rigid or flexible connector housing, etc.

In one embodiment, a quick connect assembly includes a connector housing formed from at least separate first and second housing portions, and one or more fluid connectors disposed in each of the first housing portion and the second housing portion of the connector housing and configured to fluidly couple an ink assembly and a print assembly. The ink assembly stores ink for the print assembly and the print assembly receives the ink via the one or more fluid connectors for printing onto one or more target substrates. The assembly also includes one or more conductive connectors disposed in each of the first housing portion and the second housing portion of the connector housing and configured to conductively couple hardware circuitry in the ink assembly with hardware circuitry in the print assembly. The hardware circuitry in the ink assembly controls supply of the ink to the print assembly, and the hardware circuitry in the print assembly controls printing of the ink onto the one or more target substrates. The first and second housing portions of the connector housing are configured to mate with each other to couple the one or more fluid connectors disposed in each of the first and second housing portions and to couple the one or more conductive connectors disposed in each of the first and second housing portions. The first and second housing portions configured to mate with each other by rotating at least one of the first housing portion or the second housing portion relative to another of the first housing portion or the second housing portion.

In one example, the second housing portion of the connector housing includes a male end shaped to be received into a connection opening in one or more of an ink housing of the ink assembly or a printer housing of the print assembly.

In one example, the first housing portion of the connector housing includes a female end shaped to receive a male end of one or more of an ink housing of the ink assembly or a printer housing of the print assembly.

In one example, the second housing portion of the connector housing includes a male end shaped to be received into a connection opening in an ink housing of the ink assembly or a printer housing of the print assembly. The second housing portion of the connector housing can include an opposite female end shaped to receive a male end of another one of the ink housing of the ink assembly or the printer housing of the print assembly.

In one example, the first housing portion or the second housing portion of the connector housing includes one or more securing pins radially extending into an interior volume that is bounded by an inner surface of the connector housing. The one or more securing pins positioned in the connector housing can be received into one or more corresponding slots in another of the first housing portion or the second housing portion of the connector housing.

In one example, the connector housing is shaped to secure the print assembly with the ink assembly at several different angles.

In one example, the connector housing is a rigid body.

In one example, the connector housing is a flexible body configured to allow the print assembly to move relative to the ink assembly while the connector housing maintains connection between the print assembly and the ink assembly.

In one example, the connector housing extends from a first end to a second end that are not parallel to each other. The first end can be configured to couple with the print assembly, the second end configured to couple with the ink assembly.

In one example, the print assembly is a first print assembly, and the connector housing is shaped to interchangeably mate with one or more additional, different, second print assemblies in order to couple the one or more additional, different, second print assemblies with the ink assembly.

In one embodiment, a method (e.g., for providing a quick connect assembly) includes obtaining a connector housing, and placing one or more fluid connectors in the connector housing, the one or more fluid connectors configured to fluidly couple an ink assembly and a print assembly. The ink assembly stores ink for the print assembly and the print assembly receives the ink via the one or more fluid connectors for printing onto one or more target substrates. The method also includes placing one or more conductive connectors in the connector housing. The one or more conductive connectors are configured to conductively couple hardware circuitry in the ink assembly with hardware circuitry in the print assembly. The hardware circuitry in the ink assembly controls supply of the ink to the print assembly, and the hardware circuitry in the print assembly controls printing of the ink onto the one or more target substrates.

In one example, placing the one or more fluid connectors and placing the one or more conductive connectors in the connector housing include positioning the one or more fluid connectors and the one or more conductive connectors in the connector housing such that a male end of the connector housing is positioned to be received into a connection opening in one or more of an ink housing of the ink assembly or a printer housing of the print assembly.

In one example, placing the one or more fluid connectors and placing the one or more conductive connectors in the connector housing include positioning the one or more fluid connectors and the one or more conductive connectors in the connector housing such that a female end of the connector housing is positioned to receive a male end of one or more of an ink housing of the ink assembly or a printer housing of the print assembly.

In one example, the method also includes coupling one or more securing pins to the connector housing so that the one or more securing pins radially extending into an interior volume that is bounded by an inner surface of the connector housing. The one or more securing pins can be positioned in the connector housing to be received into one or more corresponding slots in a housing of one or more of the ink assembly or the print assembly.

In one embodiment, a method (e.g., for operating a quick disconnect assembly) includes coupling a first end of a connector housing with an ink assembly. The connector housing includes one or more fluid connectors that fluidly couple with the ink assembly that stores ink for a print assembly. The connector housing also includes one or more conductive connectors that conductively couple with hardware circuitry in the ink assembly that controls supply of the ink from the ink assembly. The method also includes coupling a different, second end of the connector housing with the print assembly. The connector housing is coupled with the print assembly so that the one or more fluid connectors also fluidly couple with the print assembly to supply the ink from the ink assembly to the print assembly. The connector housing is coupled with the print assembly so that the one or more conductive connectors also conductively couple with hardware circuitry in the print assembly that controls printing of the ink onto one or more target substrates.

In one example, one or more of coupling the first end of the connector housing with the ink assembly or coupling the second end of the connector housing with the print assembly includes rotating the connector housing relative to one or more of an ink housing of the ink assembly or a printer housing of the print assembly.

In one example, one or more of coupling the first end of the connector housing with the ink assembly or coupling the second end of the connector housing with the print assembly includes inserting the connector housing into a connection opening in one or more of an ink housing of the ink assembly or a printer housing of the print assembly.

In one example, one or more of coupling the first end of the connector housing with the ink assembly or coupling the second end of the connector housing with the print assembly includes receiving a male end of one or more of an ink housing of the ink assembly or a printer housing of the print assembly into the connector housing.

In one example, one or more of coupling the first end of the connector housing with the ink assembly or coupling the second end of the connector housing with the print assembly includes inserting one or more securing pins radially extending into an interior volume of the connector housing into one or more corresponding slots in a housing of one or more of the ink assembly or the print assembly.

In one example, the method also includes changing an orientation angle of the print assembly relative to the ink assembly by rotating the connector housing relative to one or more of the print assembly or the ink assembly without detaching the connector housing from either the print assembly or the ink assembly.

In one example, the method also includes detaching the print assembly from the connector housing and connecting a different print assembly to the connector housing so that the one or more fluid connectors fluidly couple the ink assembly with the different print assembly and the one or more conductive connectors conductively couple the ink assembly with the different print assembly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
   obtaining a connector housing;
   placing one or more fluid connectors in the connector housing, the one or more fluid connectors configured to fluidly couple an ink assembly and a print assembly, the ink assembly storing ink for the print assembly and the print assembly receiving the ink via the one or more fluid connectors for printing onto one or more target substrates; and
   placing one or more conductive connectors in the connector housing, the one or more conductive connectors configured to conductively couple hardware circuitry in the ink assembly with hardware circuitry in the print assembly, the hardware circuitry in the ink assembly controlling supply of the ink to the print assembly, the hardware circuitry in the print assembly controlling printing of the ink onto the one or more target substrates,
   wherein the one or more fluid connectors and the one or more conductive connectors are placed in the connector housing such that the connector housing couples with the ink assembly or the print assembly by rotating the connector housing relative to one or more of an ink housing of the ink assembly or a printer housing of the print assembly.

2. The method of claim 1, wherein placing the one or more fluid connectors and placing the one or more conductive connectors in the connector housing include positioning the one or more fluid connectors and the one or more conductive connectors in the connector housing such that a male end of the connector housing is positioned to be received into a connection opening in one or more of the ink housing of the ink assembly or the printer housing of the print assembly.

3. The method of claim 1, wherein placing the one or more fluid connectors and placing the one or more conductive connectors in the connector housing include positioning the one or more fluid connectors and the one or more conductive connectors in the connector housing such that a female end of the connector housing is positioned to receive a male end of one or more of the ink housing of the ink assembly or the printer housing of the print assembly.

4. The method of claim 1, further comprising coupling one or more securing pins to the connector housing so that the one or more securing pins radially extending into an interior volume that is bounded by an inner surface of the connector housing, the one or more securing pins positioned in the connector housing to be received into one or more corresponding slots in one or more of the ink housing of the ink assembly or the printer housing of the print assembly.

5. A method comprising:
   coupling a first end of a connector housing with an ink assembly, the connector housing including one or more fluid connectors that fluidly couple with the ink assembly that stores ink for a print assembly, the connector housing also including one or more conductive connectors that conductively couple with hardware circuitry in the ink assembly that controls supply of the ink from the ink assembly; and
   coupling a different, second end of the connector housing with the print assembly, the connector housing coupled with the print assembly so that the one or more fluid connectors also fluidly couple with the print assembly to supply the ink from the ink assembly to the print assembly, the connector housing coupled with the print assembly so that the one or more conductive connectors also conductively couple with hardware circuitry in the print assembly that controls printing of the ink onto one or more target substrates, wherein one or more of coupling the first end of the connector housing with the ink assembly or coupling the second end of the connector housing with the print assembly includes rotating the connector housing relative to one or more of an ink housing of the ink assembly or a printer housing of the print assembly.

6. The method of claim 5, wherein one or more of coupling the first end of the connector housing with the ink assembly or coupling the second end of the connector housing with the print assembly includes inserting the connector housing into a connection opening in one or more of the ink housing of the ink assembly or the printer housing of the print assembly.

7. The method of claim 5, wherein one or more of coupling the first end of the connector housing with the ink assembly or coupling the second end of the connector housing with the print assembly includes receiving a male end of one or more of the ink housing of the ink assembly or the printer housing of the print assembly into the connector housing.

8. The method of claim 5, wherein one or more of coupling the first end of the connector housing with the ink assembly or coupling the second end of the connector housing with the print assembly includes inserting one or more securing pins radially extending into an interior volume of the connector housing into one or more corresponding slots in one or more of the ink housing of the ink assembly or the printer housing of the print assembly.

9. The method of claim 5, further comprising changing an orientation angle of the print assembly relative to the ink assembly by rotating the connector housing relative to one or more of the print assembly or the ink assembly without detaching the connector housing from either the print assembly or the ink assembly.

10. A method comprising:
coupling a first end of a connector housing with an ink assembly, the connector housing including one or more fluid connectors that fluidly couple with the ink assembly that stores ink for a print assembly, the connector housing also including one or more conductive connectors that conductively couple with hardware circuitry in the ink assembly that controls supply of the ink from the ink assembly;
coupling a different, second end of the connector housing with the print assembly, the connector housing coupled with the print assembly so that the one or more fluid connectors also fluidly couple with the print assembly to supply the ink from the ink assembly to the print assembly, the connector housing coupled with the print assembly so that the one or more conductive connectors also conductively couple with hardware circuitry in the print assembly that controls printing of the ink onto one or more target substrates; and
changing an orientation angle of the print assembly relative to the ink assembly by rotating the connector housing relative to one or more of the print assembly or the ink assembly without detaching the connector housing from either the print assembly or the ink assembly.

11. The method of claim 10, wherein one or more of coupling the first end of the connector housing with the ink assembly or coupling the second end of the connector housing with the print assembly includes rotating the connector housing relative to one or more of an ink housing of the ink assembly or a printer housing of the print assembly.

12. The method of claim 10, wherein one or more of coupling the first end of the connector housing with the ink assembly or coupling the second end of the connector housing with the print assembly includes inserting the connector housing into a connection opening in one or more of an ink housing of the ink assembly or a printer housing of the print assembly.

13. The method of claim 10, wherein one or more of coupling the first end of the connector housing with the ink assembly or coupling the second end of the connector housing with the print assembly includes receiving a male end of one or more of an ink housing of the ink assembly or a printer housing of the print assembly into the connector housing.

14. The method of claim 10, wherein one or more of coupling the first end of the connector housing with the ink assembly or coupling the second end of the connector housing with the print assembly includes inserting one or more securing pins radially extending into an interior volume of the connector housing into one or more corresponding slots in a housing of one or more of the ink assembly or the print assembly.

* * * * *